US010400612B2

(12) United States Patent
Freeman et al.

(10) Patent No.: US 10,400,612 B2
(45) Date of Patent: Sep. 3, 2019

(54) FIBER REINFORCED AIRFOIL

(71) Applicant: Rolls-Royce Corporation, Indianapolis, IN (US)

(72) Inventors: Ted Freeman, Danville, IN (US); Todd Engel, San Francisco, CA (US); Adam Chamberlain, Mooresville, IN (US); Aaron Sippel, Zionsville, IN (US); Sean Landwehr, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 303 days.

(21) Appl. No.: 15/370,824

(22) Filed: Dec. 6, 2016

(65) Prior Publication Data
US 2017/0298745 A1    Oct. 19, 2017

Related U.S. Application Data

(60) Provisional application No. 62/301,286, filed on Feb. 29, 2016, provisional application No. 62/269,652, filed on Dec. 18, 2015.

(51) Int. Cl.
*F01D 5/28* (2006.01)
*F01D 5/14* (2006.01)
(Continued)

(52) U.S. Cl.
CPC ............ *F01D 5/282* (2013.01); *F01D 5/147* (2013.01); *F01D 5/225* (2013.01); *F01D 5/284* (2013.01);
(Continued)

(58) Field of Classification Search
CPC .......... F01D 5/282; F01D 9/041; F01D 5/225; F01D 25/005; F01D 5/147; F01D 5/284;
(Continued)

(56) References Cited

U.S. PATENT DOCUMENTS 4,022,547 A * 5/1977 Stanley ................... F01D 5/282
416/230
4,111,606 A    9/1978 Prewo
(Continued)

FOREIGN PATENT DOCUMENTS

EP    1 555 391 A2    7/2005
EP    2 474 638 A2    7/2012
(Continued)

OTHER PUBLICATIONS

European Office Action, dated Jun. 20, 2018, pp. 1-8, issued in European Patent Application No. 16 204 722.9, European Patent Office, Munich, Germany.
(Continued)

*Primary Examiner* — Joseph J Dallo
(74) *Attorney, Agent, or Firm* — Brinks Gilson & Lione

(57) ABSTRACT

An airfoil and a method of manufacturing an airfoil may be provided, where the airfoil comprises a core and a shell. The core comprises core ceramic fibers extending along a span of the airfoil. The shell surrounds the core and includes shell ceramic fibers. Substantially all of the core ceramic fibers are arranged in a radial direction. The airfoil may also be a ceramic matrix composite formed by infiltrating the core and the shell with a matrix material.

20 Claims, 6 Drawing Sheets

(51) Int. Cl.
   *F04D 29/02*   (2006.01)
   *F04D 29/32*   (2006.01)
   *F04D 29/54*   (2006.01)
   *F01D 5/22*    (2006.01)
   *F01D 9/04*    (2006.01)
   *F01D 25/00*   (2006.01)

(52) U.S. Cl.
   CPC ........... *F01D 9/041* (2013.01); *F01D 25/005* (2013.01); *F04D 29/023* (2013.01); *F04D 29/324* (2013.01); *F04D 29/542* (2013.01); *F05D 2230/30* (2013.01); *F05D 2300/6033* (2013.01); *F05D 2300/6034* (2013.01)

(58) Field of Classification Search
   CPC .... F04D 29/542; F04D 29/324; F04D 29/023; F05D 2230/30; F05D 2300/6034; F05D 2300/6033
   See application file for complete search history.

(56) References Cited

U.S. PATENT DOCUMENTS

| | | | |
|---|---|---|---|
| 4,659,624 A | 4/1987 | Yeager et al. | |
| 5,222,866 A | 6/1993 | LaBrouche et al. | |
| 7,278,830 B2* | 10/2007 | Vetters | F01D 5/147 416/229 R |
| 7,579,094 B2 | 8/2009 | Subramanian et al. | |
| 8,696,319 B2 | 4/2014 | Naik | |
| 9,033,673 B2 | 5/2015 | Roussille et al. | |
| 9,080,454 B2 | 7/2015 | Coupe et al. | |
| 2005/0158171 A1* | 7/2005 | Carper | B32B 18/00 415/200 |
| 2008/0199661 A1* | 8/2008 | Keller | B32B 18/00 428/188 |
| 2009/0071160 A1* | 3/2009 | Keller | F01D 9/023 60/753 |
| 2009/0252907 A1* | 10/2009 | Keller | B32B 18/00 428/34.6 |
| 2010/0032875 A1* | 2/2010 | Merrill | B28B 1/008 264/642 |
| 2011/0229337 A1 | 9/2011 | Carper et al. | |
| 2013/0004325 A1* | 1/2013 | McCaffrey | F01D 5/28 416/241 B |
| 2013/0011271 A1 | 1/2013 | Shi et al. | |
| 2014/0093381 A1 | 4/2014 | Delvaux et al. | |
| 2014/0272274 A1 | 9/2014 | Lazur | |
| 2014/0369847 A1 | 12/2014 | Dambrine et al. | |
| 2015/0093249 A1* | 4/2015 | Lang | F01D 5/14 416/241 B |
| 2015/0226071 A1 | 8/2015 | Marshall et al. | |

FOREIGN PATENT DOCUMENTS

| | | |
|---|---|---|
| EP | 2 540 975 A2 | 1/2013 |
| GB | 2 262 315 A | 6/1993 |
| WO | WO 2015/047485 A2 | 4/2015 |
| WO | WO 2015/047511 A2 | 4/2015 |

OTHER PUBLICATIONS

Extended European Search Report, dated May 4, 2017, pp. 1-14, issued in European Patent Application No. 16204722.9, European Patent Office, Munich, Germany.

European Office Action, issued in European Application No. 16 204 722.9, dated Jun. 28, 2019, pp. 1-5, European Patent Office, Munich, Germany.

* cited by examiner

FIBER REINFORCED AIRFOIL

CROSS REFERENCE

The present application is a non-provisional application of, and claims priority under 35 U.S.C. § 119(e) to U.S. Provisional Application No. 62/269,652, "Fiber Reinforced Turbine Blade", filed Dec. 18, 2015, which is incorporated by reference in its entirety, and is a non-provisional application of, and claims priority under 35 U.S.C. § 119(e) to U.S. Provisional Application No. 62/301,286, "Fiber Reinforced Airfoil", filed Feb. 29, 2016, which is incorporated by reference in its entirety.

GOVERNMENT LICENSE RIGHTS

This invention was made with government support under contract FA8650-11-C-2109 awarded by the United States Air Force. The government has certain rights in the invention.

TECHNICAL FIELD

This disclosure relates to airfoils for use in turbine engines and, in particular, to airfoils that have ceramic matrix composite (CMC) bodies.

BACKGROUND

The statements in this section merely provide background information related to the present disclosure and may not constitute prior art.

A CMC body may be used within a turbine section of a gas turbine engine to allow higher operating temperatures within the turbine section. In some examples, the CMC body may be a CMC vane or a CMC blade, which is subjected to mechanical stress such as aerodynamic and centrifugal load, and which is subjected to a thermal load. A CMC material is vulnerable to mechanical distress under excessive mechanical loading. Furthermore, components operating within a gas turbine engine for extended time periods are vulnerable to creep rupture. Therefore, a CMC body which is designed to tolerate high stress mechanical conditions over a long period of time is desirable.

SUMMARY

Further areas of applicability will become apparent from the description provided herein. It should be understood that the description and specific examples are intended for purposes of illustration only and are not intended to limit the scope of the present disclosure.

In one embodiment, an airfoil is provided comprising a unitary CMC body. The unitary CMC body comprises a core and a shell. The core comprises multiple core ceramic fibers, wherein substantially all of the core ceramic fibers are arranged in a radial direction. The shell surrounds the core and comprises multiple shell ceramic fibers.

In yet another embodiment, a vane or blade for a gas turbine engine is provided, the vane or blade comprising a unitary CMC body. The unitary CMC body comprises a core and a shell. The core comprises core ceramic fibers, wherein substantially all of the core ceramic fibers are arranged in a radial direction. The shell surrounds the core and comprises shell ceramic fibers.

In another embodiment, a method of manufacturing a CMC airfoil may be provided comprising providing a porous ceramic preform core, forming a porous ceramic preform shell configured to extend around the ceramic preform core, and forming the porous ceramic preform core and the porous ceramic preform shell into a CMC airfoil. The ceramic preform core comprises core ceramic fibers. Substantially all of the core ceramic fibers are arranged in a radial direction. The porous ceramic preform shell comprises shell ceramic fibers.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In one example, an airfoil is provided comprising a unitary CMC body. The unitary CMC body comprises a core and a shell. The core comprises multiple core ceramic fibers, where substantially all of the core ceramic fibers are arranged in a radial direction. The shell surrounds the core and comprises multiple shell ceramic fibers. In one example, the radial direction extends along the airfoil from a base of the airfoil to a tip of the airfoil.

One technical advantage of the systems and methods described below may be that an airfoil, such as a vane or blade, may be used within a turbine engine at a higher temperature than other airfoils, as a consequence of the high thermal tolerance of CMC material. Another technical advantage of the systems and methods described below may be that an airfoil, such as a vane or blade, may be used within a turbine engine under conditions involving higher centrifugal force for longer periods of time, as a consequence of tensile strength and high creep resistance of the core ceramic fibers.

Figure 1:
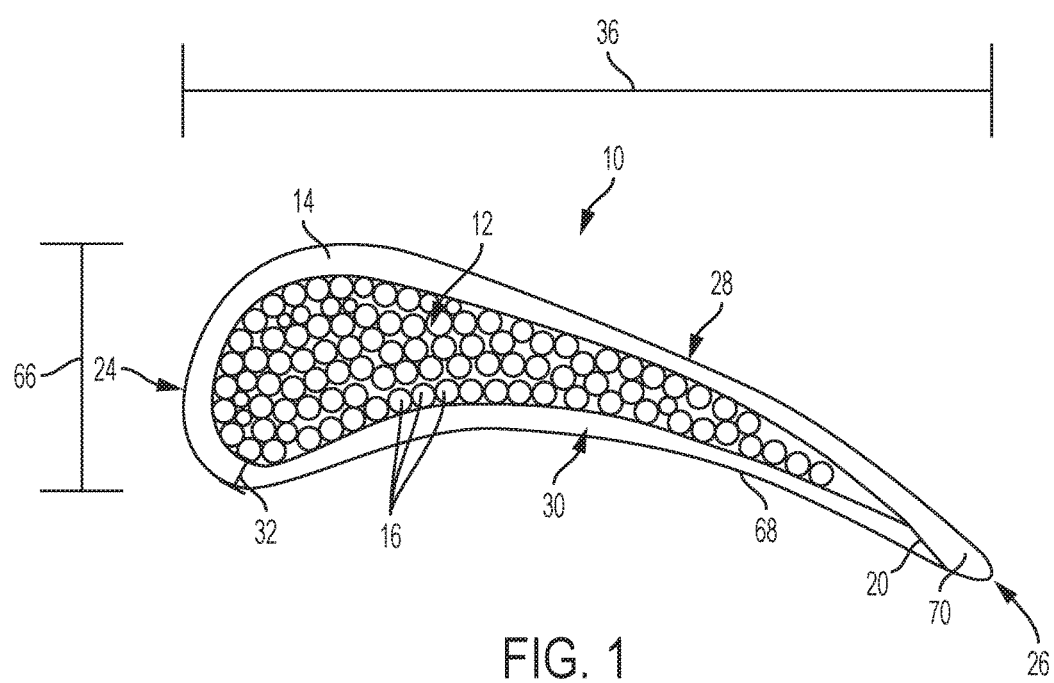
FIG. 1 illustrates a cross-sectional side view of a first example of an airfoil.

FIG. 1 illustrates a cross-sectional side view of a first example of an airfoil 10 comprising a core 12 and a shell 14. The airfoil 10 may be any object that generates a pressure differential as fluid flows over the object. Examples of the airfoil 10 may include a wing, a compressor rotor, a stator, a turbine blade, and a vane. A chord length 36 of the airfoil 10 may be the distance between a leading edge 24 and a trailing edge 26 of the airfoil 10. Typically, the pressure differential is generated from fluid flowing from the leading edge 24 to the trailing edge 26. A thickness 66 of the airfoil 10 may be the distance between a pressure side 30 and a suction side 28 of the airfoil 10. The thickness 66 of the airfoil 10 may vary from the leading edge 24 to the trailing edge 26. A radial length (34 in FIG. 3) of the airfoil 10 may be a three dimensional extension of the airfoil 10 from a base (86 in FIG. 4) to a tip (84 in FIG. 4). The chord length 36, the thickness 66, and angle of attack (not shown) of the airfoil 10 may vary along the extent of the radial length 34.

The core 12 may be any object that forms an interior portion of the airfoil 10. The cross-section of the core 12 may have a circular shape, an oval shape, a tear-drop shape, a pseudo-airfoil shape, or any other shape. Examples of the core 12 may include a cylindrical column, a column approximating the shape of the airfoil 10, or an object shaped substantially the same as the airfoil 10, but smaller than the airfoil 10. The core 12 may comprise multiple core ceramic fibers 16 arranged in the radial direction along the airfoil 10. The core ceramic fibers 16 may be clustered toward the leading edge 24 of the airfoil 10 or around the point of the maximum thickness 66 of the airfoil 10 to provide increased structural support against centrifugal forces.

The core ceramic fibers may be any ceramic fiber which is configured within the core 12 to bear the centrifugal load from rotation of the airfoil 10 during operation of a gas turbine engine. The core ceramic fibers 16 may be arranged along the radial direction of the airfoil 10. Examples of the core ceramic fibers 16 may include silicon carbide fibers, carbon monofilament fibers, unidirectional ceramic tape, aluminium oxide fibers, Hi-Nicalon Type-S fibers, SCS Ultra fibers, or any other ceramic fibers. The core ceramic fibers 16 may also include multi-fiber tows comprising a bundle of smaller ceramic fibers. The multi-fiber tows may each comprise between 200-600 smaller ceramic fibers. The core ceramic fibers 16 may have a diameter between 0.005 inches to 0.01 inches. Depending on the size of the airfoil 10 and diameter of the core ceramic fibers 16, the core 12 may comprise between 100 and 5000 core ceramic fibers 16 in some examples.

Substantially all of the core ceramic fibers 16 may be arranged in the radial direction. Substantially all of the core ceramic fibers 16 means at least 75 percent of all ceramic fibers included in the core 12. In some examples, at least 80 percent of all ceramic fibers included in the core 12 may be arranged in the radial direction. The radial direction may be defined by a radial axis (80 in FIG. 3) which runs along the radial length 34 of the airfoil. In some examples, no more than 25% of the core ceramic fibers may be angularly offset from the radial axis 80 of the airfoil 10 by more than 10 degrees. In some examples, the core 12 may not include any ceramic fibers that are woven between the core ceramic fibers 16 within the core 12. Alternatively or in addition, the core 12 may not include any ceramic fibers that are arranged in a circumferential direction to bind the core ceramic fibers 16 together. Alternatively or in addition, the core ceramic fibers 16 may not be interwoven with one another. In some embodiments, particularly where the airfoil 10 does not include a radial twist, the core ceramic fibers 16 may be arranged in a parallel configuration within the core 12. Where the airfoil 10 does not include a radial twist or radial bend, the angle of the radial axis 80 does not change with respect to the position on the chord of the airfoil 10.

Where the airfoil has a twist (not shown), the radial axis 80 may vary according to the position of core ceramic fibers 16 with respect to the chord length 36 of the airfoil 10. Where the angle of attack of the airfoil 10 changes between the base and the tip of the radial length 34, the radial axis 80 may have a different angle depending on its position between the leading edge 24 and the trailing edge 26. Accordingly, in such a configuration, the ceramic core fibers 16 may be aligned with the radial axis 80 based on a specific position along the chord length 36, but may not be parallel to other core ceramic fibers 16 which are aligned with the radial axis 80 based on other positions along the chord length. In such a configuration, substantially all of the core ceramic fibers are 16 aligned in the radial direction.

The shell 14 may be any object that surrounds the core 12 either partially or completely. The shell 14 may conform to the shape of the outer surface 68 of the airfoil 10. The shell 14 may define the shape of the airfoil 10 in some examples. Examples of the shell 14 may include a CMC turbine blade or vane; or a hollow shell of a turbine blade or vane. The shell 14 may comprise multiple shell ceramic fibers (38 and 40 in FIG. 4). The shell ceramic fibers 38 and 40 may be arranged in any suitable manner, such as in a three dimensional weave, woven into a substantially planar ply, braided into a sleeve, or be arranged in sheets of unidirectional tape. The shell ceramic fibers 38 and 40 may be overlapped into layers to increase the thickness of the shell 14. In some examples, the shell 14 may consist of two to four layers of the shell ceramic fibers 38 and 40. The thickness 32 of the shell 14 may vary relative to the position along the length 36 of the airfoil 10. In some examples, the maximum of the thickness 32 of the shell 14 may occur near the leading edge 24, where the highest thermal loading on the airfoil 10 may occur.

Each of the shell ceramic fibers 38 and 40 may be any ceramic fiber that may be woven with other ceramic fibers. Examples of the shell ceramic fibers 38 and 40 may be silicon carbide fibers, aluminium oxide fibers, unidirectional tape, carbon monofilament, or any other ceramic fibers. Each of the shell ceramic fibers 38 and 40 may have a diameter between 0.0005 inches to 0.002 inches. The ratio between the diameter of the core ceramic fibers 16 to the diameter of the shell ceramic fibers 38 and 40 may be between 2.5 and 20. A creep resistance of the shell ceramic fibers 38 and 40 may be less than a creep resistance of the core ceramic fibers 16.

As shown in FIG. 1, the shell 14 may comprise layers which wrap around the core 12 from one of the trailing edge 26 of the pressure side 30 to the trailing edge 26 of the suction side 28. The ends of the layers near the trailing edge 26 on the pressure side 30 and suction side 28 may be coupled by a butt joint 20. A trailing portion 70 of at least one layer may extend in a trailing direction from the core 12 to form the trailing edge 26 of the airfoil. Alternatively, trailing portions 70 of two layers may be needled punched together to form the trailing edge 26 of the airfoil.

Figure 2:
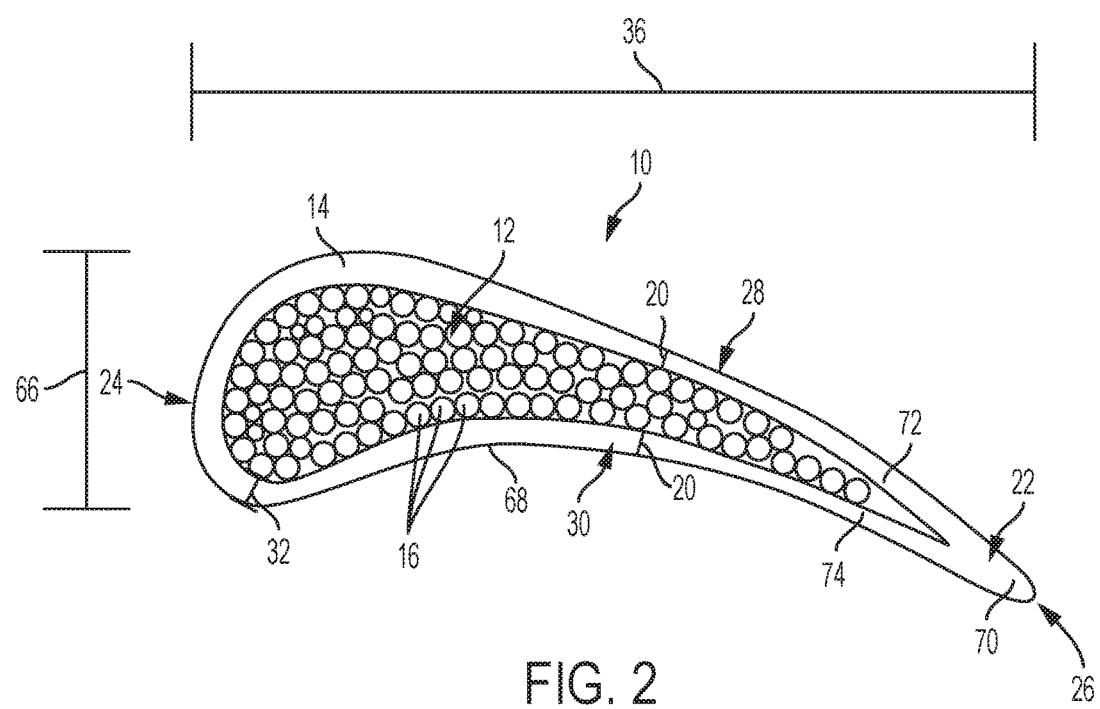
FIG. 2 illustrates a cross-sectional side view of a second example of an airfoil.

FIG. 2 illustrates an embodiment of the airfoil 10, where the trailing edge 26 of the shell 14 comprises a Y-cloth ply 22 extending to the pressure side 30 and to the suction side 28 of the shell 14. The Y-cloth ply 22 may comprise a trailing portion 70. A suction portion 72 of the Y-cloth ply 22 extends from the trailing portion 70 and to the suction side 28 of the shell 14. A pressure portion 74 of the Y-cloth ply 22 extends from the trailing portion 70 and to the pressure side 30 of the shell 14. The Y-cloth ply 22 may be any ceramic ply which may form the trailing edge 26 of the shell 14 and couple the trailing edge 25 of the shell 14 to the other portions of the shell 14. Examples of Y-cloth plies 22 may be woven aluminium oxide fiber plies, silicon carbide fiber plies, unidirectional tape, or any other oxide or non-oxide ceramic fiber ply. The Y-cloth ply 22 may extend over or under layers of the shell 14 or may be placed between plies 18 of the interwoven ceramic fibers 38 and 40. Alternatively, the suction portion 72 and pressure portion 74 of the Y-cloth ply 22 may form butt joints 20 with the shell ceramic fibers 38 and 40 of the shell 14. The trailing edge 265 of the shell 14 may also comprise a plurality of Y-cloths plies 22.

Figure 3:
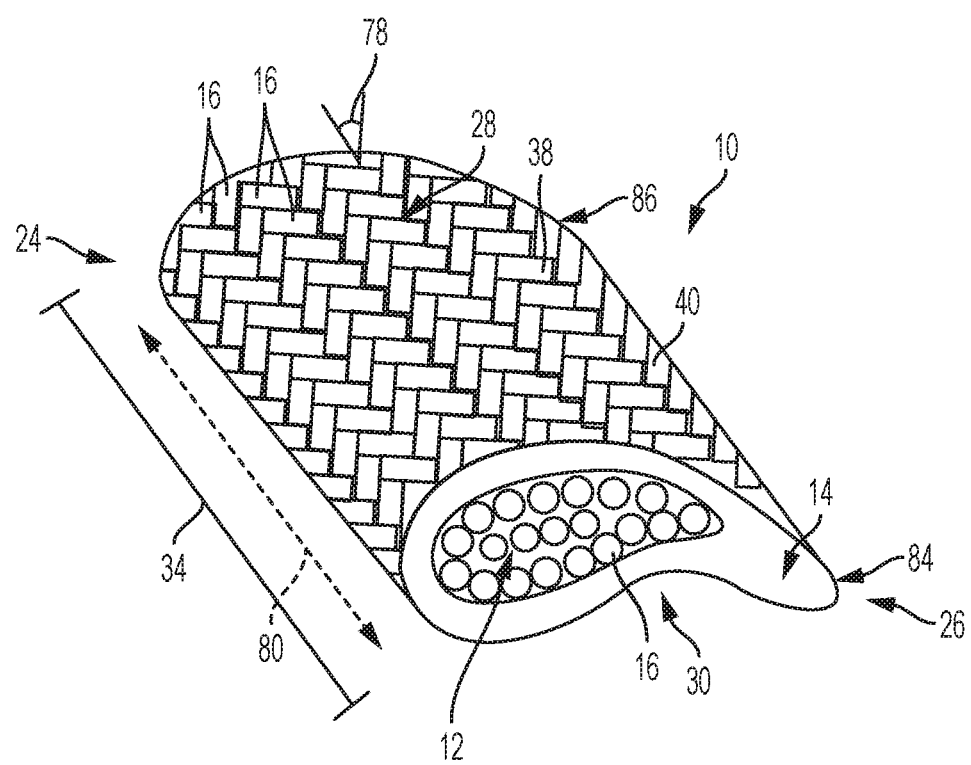
FIG. 3 illustrates a partial cross-sectional perspective view of a third example of an airfoil.

FIG. 3 illustrates an embodiment of the airfoil, where at least a portion of the shell ceramic fibers 38 and 40 may be arranged in a braided configuration. In another configuration, the shell ceramic fibers 38 and 40 are arranged in multiple braided layers 76. The braids of the shell ceramic fibers 38 and 40 may be arranged at opposing angles from the radial axis 80 of the airfoil 10. Therefore, the shell ceramic fibers 38 braided in a first direction may have a braid angle 78 with respect to the radial axis 80 between 15 degrees and 75 degrees. The shell ceramic fibers 40 braided in the second direction may have an opposite braid angle 78 with respect to the radial axis 80 between −15 degrees and −75 degrees.

As shown in FIG. 3, the shell 14 may be formed into a sleeve which is continuous about the circumference of the shell 14. The sleeve may be woven or braided. This sleeve may be formed around the core ceramic fibers 16, or the core ceramic fibers 16 may be inserted into the sleeve after the shell 14 has been formed.

Figure 4:
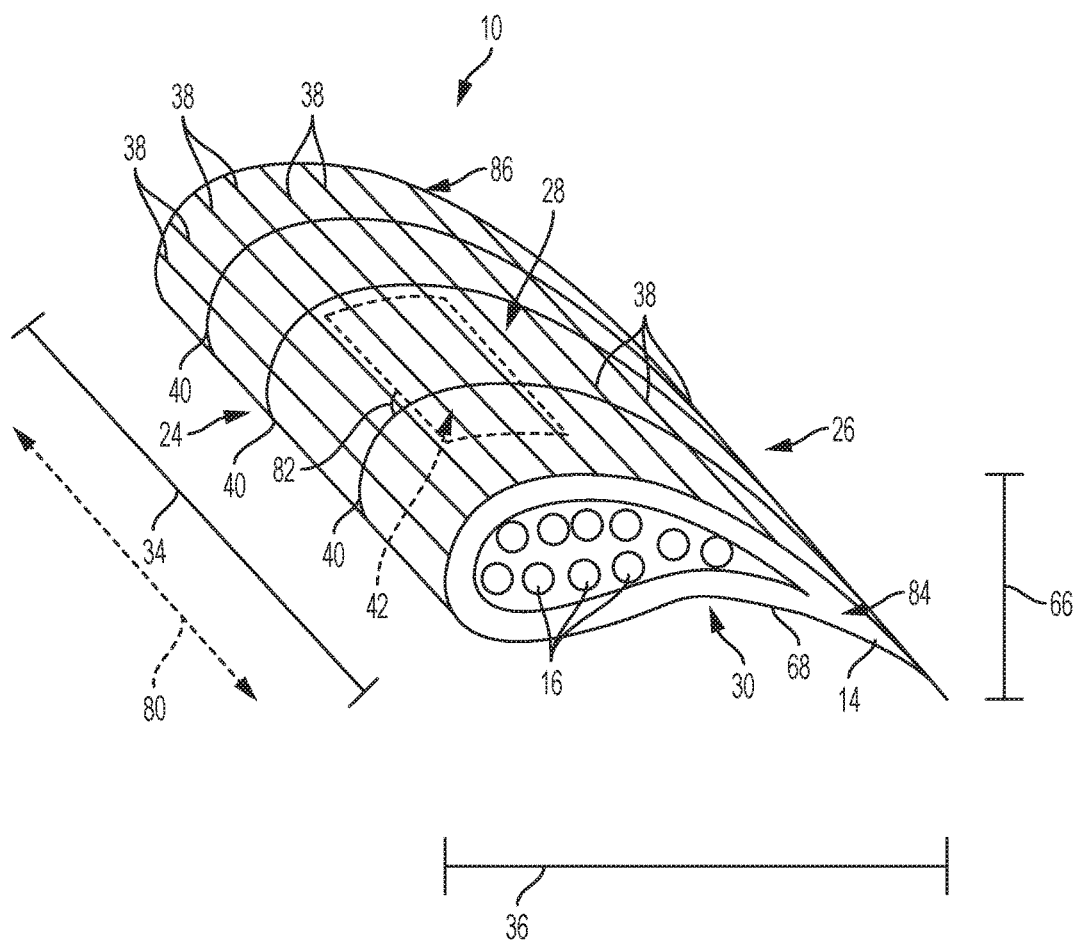
FIG. 4 illustrates a partial cross-sectional perspective view of a fourth example of an airfoil.

FIG. 4 illustrates an embodiment of the airfoil 10 showing the shell 14 comprising the shell ceramic fibers 38 and 40 in a woven configuration. The shell ceramic fibers 38 and 40 comprise warp fibers and weft fibers. In some embodiments, a first portion 38 of the shell ceramic fibers 16 may be arranged in a direction that is substantially parallel with the radial axis 80. In this configuration, the first portion 38 of shell ceramic fibers 16 may provide additional structural support to the airfoil 10 against centrifugal loading. A second portion 40 of the shell ceramic fibers 16 may be arranged at a weave angle 82 with respect to the first portion 38 of the shell ceramic fibers 16. The weave angle 82 may be between 15 degrees and 90 degrees. The second portion 40 of the shell ceramic fibers 16 may extend circumferentially about the shell 14.

The first portion 38 and second portion 40 of the shell ceramic fibers 16 may have a surface density 42. The surface density 42 of the first portion 38 may be between 10 to 30 ceramic fibers per inch of length of 36 the shell 14. The surface density of second portion 40 may be between 10 to 30 ceramic fibers per inch of span 34 of the shell 14. The surface density 42 of first portion 38 may be greater than the surface density 42 of second portion 40 to give additional tensile strength to the airfoil 10. The ratio between the surface density 42 of first portion 38 to the surface density 42 of second portion 40 may be between one and four. The second portion 40 comprises at least 25% of the shell ceramic fibers 16.

Figure 5:
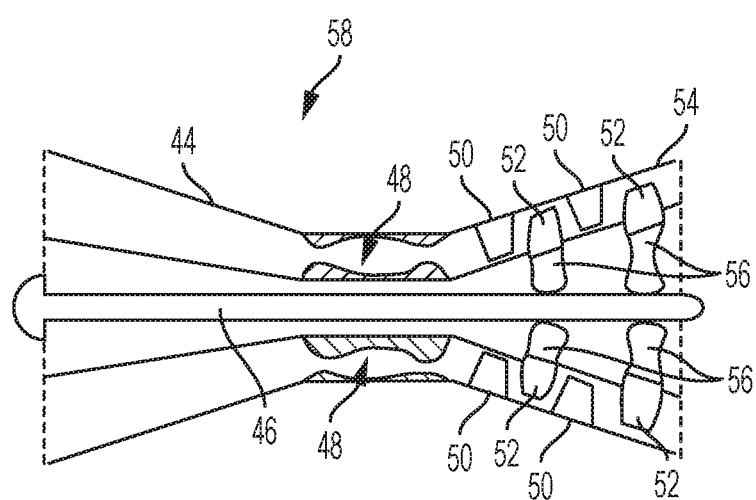
FIG. 5 illustrates a cross-sectional view of an example of a gas turbine engine, including a combustion chamber, a turbine, turbine blades, and vanes.

The embodiments of the airfoil 10 illustrated in FIGS. 1-4 and described above may be advantageous in some turbine engine systems. Referring to FIG. 5, an embodiment of a gas turbine engine 58 is illustrated. The gas turbine engine 58 system may comprise a compressor 44, a combustion chamber 48 with a turbine 54 arranged behind the combustion chamber 48. Within the turbine 54, at least two rows of turbine blades 52 extend radially from a central shaft 46 into a turbine flow path and are attached to wheels 56 that are in turn connected to the central shaft 46. Vanes 50 may be located between the two rows of turbine blades 52 and/or in front of the turbine blades 52 toward the combustion chamber 48 of the gas turbine engine 58 system. The vanes 50 may extend radially inward into the turbine flow path, or may project radially outward from a central hub that encircles the central shaft 46. As hot gas proceeds from the combustion chamber 48 into the turbine 54, the hot gas may rotate the first row of turbine blades 52. After passing through the first row of turbine blades 52, the hot gas may pass through the stationary vanes 50, which smooth the flow of the hot gas through the turbine 54 and direct the flow of the gas perpendicular to the second row of the turbine blades 52. When the gas passes through each of the turbine blades 52 and the vanes 50, significant thermal loading may occur. The embodiments of the airfoil 10 described above may be used for the vanes 50 and/or the turbine blades 52 in order to cool the vanes 50 and/or the turbine blades 52 and to reduce thermal gradients that may develop from thermal loading.

Furthermore, although specific components are described above, methods, systems, and articles of manufacture described herein may include additional, fewer, or different components. For example, the turbine engine 58 may not include a compressor 44.

Figure 6:
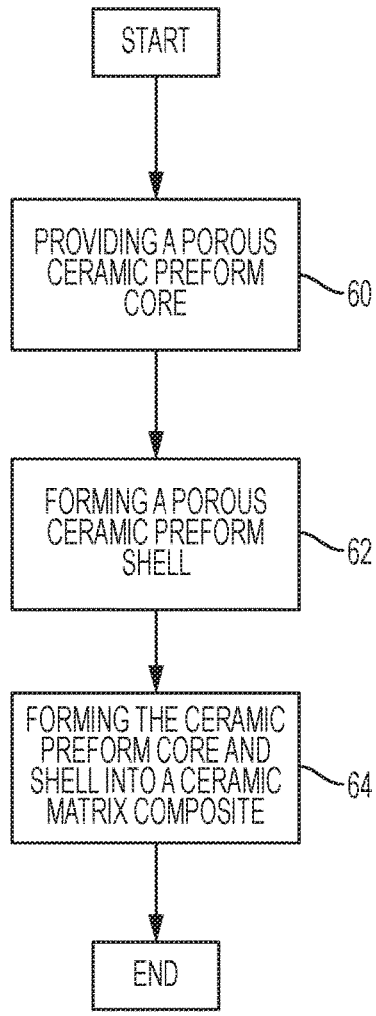
FIG. 6 illustrates a flow diagram of operations to manufacture the airfoil.

FIG. 6 illustrates a flow diagram of operations to manufacture the airfoil 10 as a CMC component. The operations may include fewer, additional, or different operations than illustrated in FIG. 6. Alternatively or in addition, the operations may be performed in a different order than illustrated.

The CMC airfoil 10 may be formed in a manufacturing process. Initially, a porous ceramic preform core is provided comprising the core ceramic fibers 16 (60), the ceramic preform defining the approximate shape of the core 12. Examples of the core ceramic fibers 16 may include silicon carbide, carbon, mullite, zirconia, and alumina.

After the porous ceramic preform core has been provided (60), a porous ceramic preform shell may be formed to extend around the porous ceramic preform core (62). The porous ceramic preform shell may define the approximate shape of the shell 14 and may comprise the shell ceramic fibers 38 and 40. Examples of the shell ceramic fibers 38 and 40 may include silicon carbide, carbon, mullite, zirconia, and alumina. The porous ceramic preform core may be formed (60) by applying multiple plies 18 to the pressure side 30 and the suction side 28 of the porous ceramic preform core.

After the porous ceramic preform shell has been formed (62), the ceramic preform is formed (64) by infiltration of a matrix material. Examples of the matrix material may include silicon carbide, alumina, or a molten alloy such as a silicon metal or other alloy. Infiltration may take place through chemical vapor infiltration (CVI), slurry infiltration, melt infiltration, or other comparable techniques. A combination of infiltration methods may be used. For example, an initial CVI may be used to coat and rigidize the ceramic fibers. Then slurry infiltration may be used with a mixture of Silicon Carbide and Carbon. Finally, melt infiltration of Silicon material may be used to complete the infiltration. In some examples, a Boron Nitrate coating may be applied to the ceramic fibers through CVI. Alternatively or in addition, a Silicon Carbide coating may be applied to the ceramic fibers. The coating of the ceramic fibers may take place before the infiltration occurs or before the ceramic fibers are arranged in a weave.

After the ceramic preform has been formed (66), in some examples, the CMC airfoil 10 may be machined to smooth edges and surfaces. Alternatively or in addition, an environmental barrier coating may be applied to the outer surface 68 of the CMC airfoil 10 in some examples in order to increase durability and provide for uniform thermal loading.

In addition to the advantages that have been described, it is also possible that there are still other advantages that are not currently recognized but which may become apparent at a later time. While various embodiments have been described, it will be apparent to those of ordinary skill in the art that many more embodiments and implementations are possible. Accordingly, the embodiments described herein are examples, not the only possible embodiments and implementations.

We claim:

1. An airfoil comprising a unitary ceramic matrix composite (CMC) body, the unitary CMC body comprising:
   a core comprising a plurality of core ceramic fibers, wherein substantially all of the plurality of the core ceramic fibers are arranged in a radial direction; and
   a shell surrounding the core, the shell comprising a plurality of shell ceramic fibers, wherein a first portion of the shell ceramic fibers are arranged in a first direction substantially aligned with a radial axis of the airfoil, and a second portion of the shell ceramic fibers are arranged to extend along a circumference of the airfoil.

2. The airfoil of claim 1, wherein the radial direction extends along the airfoil from a base of the airfoil to a tip of the airfoil.

3. The airfoil of claim 1, wherein at least a portion of the core ceramic fibers comprise a plurality of multi-fiber tows.

4. The airfoil of claim 1, wherein at least a portion of the core ceramic fibers comprise monofilament.

5. The airfoil of claim 1, wherein at least a portion of the core ceramic fibers comprise silicon carbide fibers.

6. The airfoil of claim 1, wherein the plurality of core ceramic fibers have a higher creep resistance than the plurality of shell ceramic fibers.

7. The airfoil of claim 1, wherein the plurality of core ceramic fibers comprise unidirectional ceramic tape.

8. The airfoil of claim 1, wherein the shell ceramic fibers are woven or braided.

9. The airfoil of claim 1, wherein the shell ceramic fibers consists of 2-4 plies of fibers.

10. The airfoil of claim 1, wherein a surface density of the second portion of the shell ceramic fibers is greater than a surface density of the first portion of the shell ceramic fibers.

11. The airfoil of claim 1, wherein the second portion of the shell ceramic fibers are angularly offset from a radial axis of the airfoil by between 15 degrees to 75 degrees.

12. The airfoil of claim 1, wherein a trailing end of the shell comprises a Y-cloth ply.

13. A vane or a blade for a gas turbine engine, the vane or the blade comprising a unitary ceramic matrix composite (CMC) body, the unitary CMC body comprising:
   a core comprising a plurality of core ceramic fibers, wherein substantially all of the core ceramic fibers are arranged in a radial direction; and
   a shell surrounding the core, the shell comprising a plurality of shell ceramic fibers, wherein a first portion of the shell ceramic fibers are arranged in a first direction substantially aligned with a radial axis of the airfoil, and a second portion of the shell ceramic fibers are arranged to extend along a circumference of the airfoil.

14. The vane or blade of claim 13, wherein at least 75% of the core ceramic fibers are offset from a radial axis of the blade or vane by no more than 10 degrees.

15. The vane or blade of claim 13, wherein at least 25% of the shell ceramic fibers extend circumferentially about the shell.

16. A method of manufacturing a ceramic matrix composite (CMC) airfoil comprising:
   providing a porous ceramic preform core comprising a plurality of core ceramic fibers by arranging substantially all of the core ceramic fibers in a radial direction;
   forming a porous ceramic preform shell to extend around the porous ceramic preform core, the porous ceramic preform shell comprising a plurality of shell ceramic fibers, wherein a first portion of the shell ceramic fibers are arranged in a first direction substantially aligned with a radial axis of the airfoil, and a second portion of the shell ceramic fibers are arranged to extend along a circumference of the airfoil; and
   forming the porous ceramic preform core and the porous ceramic preform shell into the CMC airfoil.

17. The method of claim 16, wherein forming the CMC airfoil comprises infiltrating a molten metal or alloy into the porous ceramic preform core and shell.

18. The method of claim 16, wherein forming the porous ceramic preform shell comprises wrapping a layer of the shell ceramic fibers around the porous ceramic preform core such that a portion of the layer extends beyond where a trailing edge of CMC airfoil will be after the CMC airfoil is formed.

19. The method of claim 16, further comprising inserting the core ceramic fibers into the porous ceramic preform shell.

20. The airfoil of claim 1, wherein a ratio between a diameter of the core ceramic fibers and a diameter of the shell ceramic fibers is at least 2.5.

* * * * *